(12) United States Patent
Brown et al.

(10) Patent No.: US 6,382,889 B1
(45) Date of Patent: May 7, 2002

(54) PORTABLE MULTI-AXIS MACHINE

(75) Inventors: Shawn Frehner Brown, Tacoma; George Eric Bible, Kent, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/781,877

(22) Filed: Feb. 12, 2001

(51) Int. Cl.[7] .................................................. B23C 1/20
(52) U.S. Cl. ...................... 409/175; 408/76; 408/237; 409/191; 409/201; 409/216; 409/235
(58) Field of Search ............................. 408/76, 88, 131, 408/234, 236, 237; 409/175, 178, 190, 191, 201, 211, 216, 235

(56) References Cited

U.S. PATENT DOCUMENTS

| | | | |
|---|---|---|---|
| 2,823,591 A | * 2/1958 | Craddock et al. | 409/190 |
| 2,891,427 A | * 6/1959 | Warsap et al. | 408/236 |
| 4,776,749 A | * 10/1988 | Wanzenberg et al. | 408/236 |
| 5,106,243 A | * 4/1992 | Hunt | 409/178 |
| 5,656,905 A | 8/1997 | Tsai | |
| 5,702,212 A | * 12/1997 | Erath et al. | 408/236 |
| 5,797,191 A | 8/1998 | Ziegert | |
| 6,048,143 A | 4/2000 | Change et al. | |
| 6,059,703 A | * 5/2000 | Heisel et al. | 409/201 |
| 6,129,489 A | * 10/2000 | Linderholm | 409/178 |
| 6,203,254 B1 | * 3/2001 | Nashiki et al. | 409/201 |
| 6,241,437 B1 | * 6/2001 | Wieland | 409/201 |

FOREIGN PATENT DOCUMENTS

DE      3732773 A1  *  4/1989

* cited by examiner

Primary Examiner—Daniel W. Howell
(74) Attorney, Agent, or Firm—Alston & Bird LLP

(57) ABSTRACT

A portable multi-axis drilling machine includes a drill mounted between a pair of 2-axis positioning devices each of which translates along X and Y axes. The positioning devices are spaced apart along a Z axis of the machine and are mounted in a frame that has a workpiece-engaging side provided with a pair of index cylinders that receive spherical tool balls mounted on the workpiece surface so as to fix the position and orientation of the machine relative to the workpiece. The frame also has swiveling feet on the workpiece-engaging side that pivot as needed to accommodate complex contoured workpiece surfaces. Rotational movement of the drill is effected by differentially translating the two positioners, and translational X and Y movements are effected by synchronously translating the positioners.

24 Claims, 4 Drawing Sheets

PORTABLE MULTI-AXIS MACHINE

FIELD OF THE INVENTION

The present invention relates to multi-axis machines for positioning a machine tool, such as a drill, riveter, or the like, relative to a structure or workpiece on which work operations are to be performed by the tool. The invention relates more particularly to a portable multi-axis positioning machine that attaches to a structure or workpiece being operated upon such that positioning and orientation of the machine are set by physically indexing the machine to features on the workpiece.

BACKGROUND OF THE INVENTION

The current state of the art in numerically controlled drilling or machining of large structures such as air frame components involves the use of large fixed-base multi-axis machines that are mounted upon a foundation and typically have a large work envelope for accessing all parts of the largest structures that are expected to be worked on. These machines are quite expensive, and also have a number of operational limitations. For instance, the machines have only one spindle and hence can perform work operations on only one location of the structure at a time. Because of the large work envelope, it is difficult for the machines to hold close tolerances over the entire range of movement capabilities in all axes of the machine. The machines also require permanent floor space and require the structure that is to be processed to be brought to the machine. The machine must then "acquire" the structure by probing known features of the structure so that the machine's controller knows where the structure is located relative to the machine. Typically a "best fit" calculation is made based on the probe data to achieve as close a fit as possible between the numerical nominal definition of the structure and the probe data. Once this process is completed, work operations can begin. During machining, it is frequently necessary to employ further aids to properly orient the machine relative to the structure, such as laser alignment systems or the like. It is also common for recalibration of the machine relative to the structure to be required during work operations.

The need to probe and calibrate the machine to the workpiece one or more times during work operations has a significant negative impact on the overall efficiency and cost of the process. Furthermore, the need to bring the workpiece to the machine means that nonproductive transit time is incurred in the process.

SUMMARY OF THE INVENTION

The present invention seeks to improve upon the situation described above by providing a portable multi-axis machine. Probing of the workpiece to be machined and "best fit" calibrating of the numerical control to the workpiece are eliminated by physically indexing the machine to the workpiece by engaging the machine with fittings or other features in known locations on the workpiece. Once the machine is engaged with the fittings or features, a coordinate system based in the machine is automatically in a known location and orientation relative to the workpiece. Moreover, because the machine is portable, the workpiece can remain in a fixed location. The machine is relatively small in size and weight, such that more than one such machine can work on different portions of the workpiece at the same time, thereby improving productivity.

To these ends, a multi-axis machine in accordance with one preferred embodiment of the invention comprises a frame structured and arranged to engage a surface of the workpiece and to engage reference features on the workpiece so as to position and orient the frame relative to the workpiece, a working module operable to hold a tool in a tool holder and manipulate the tool for performing a work operation on the workpiece, and a pair of 2-axis positioning devices. A first 2-axis positioning device is mounted on the frame and a second 2-axis positioning device is mounted on the frame spaced from the first 2-axis positioning device, each 2-axis positioning device being operable to translate independently along each of two translational axes. The working module is connected between the 2-axis positioning devices such that the working module is translated by synchronous translational movements of the 2-axis positioning devices and the working module is rotated about at least one axis by differential translational movements of the 2-axis positioning devices.

Preferably, the frame has a workpiece-engaging side structured and arranged to engage a surface of the workpiece with a three-point contact therebetween such that the frame stably engages surfaces of varying and complex contour and the three-point contact establishes approximate normality between a Z-axis of the machine and the surface of the workpiece. Additionally, the positioning devices preferably comprise XY positioning devices operable to translate the respective end of the working module independently along each of two translational X and Y axes defining an XY plane parallel to that of the other XY positioning device and spaced therefrom along the Z axis. The XY positioning devices are operable to translate along the X and Y axes independently of each other in their respective XY planes. Accordingly, for many different workpiece surface contours, the machine can achieve normality between the axis of the tool holder and the workpiece surface at any point within a working envelope of the machine.

The machine indexes to the workpiece in preferred embodiments of the invention by a pair of index cylinders mounted on the frame with their axes parallel to the Z-axis of the machine. A pair of tool balls or similar spherical fittings are rigidly mounted on the workpiece in known locations thereof so as to serve as reference points. The tool balls are received into the index cylinders of the machine, thereby indexing the machine to the workpiece. One of the index cylinders is mounted in a fixed location on the frame, and the other index cylinder is slidable for adjusting the spacing between the index cylinders.

The working module is coupled with the positioning devices by rotatable couplings such as spherical bearings or the like. In one embodiment, the working module is mounted on the first positioning device by a gimbal arrangement enabling the working module to pivot about first and second rotational axes that are perpendicular to the spindle axis of the working module, and the second positioning device is coupled with the working module via a spherical bearing accommodating the pivotal movements of the working module. The pivotal movements of the working module are produced by appropriate control of the positioning devices to provide differential movements between the two positioning devices along the X and/or Y axes. Because the working envelope of the machine is relatively small, the required range of pivotal movement for maintaining normality of the spindle axis to the workpiece surface at any point in the working envelope is relatively small (e.g., about 30 degrees or less) for workpieces having relatively large radii of curvature as is true for components of air frames such as wing and fuselage sections. Accordingly, there is no need to provide the large range of rotational motion about the rotational axes that is commonly employed in large fixed-base multi-axis machines.

The first XY positioning device preferably comprises a first pair of spaced X-axis rails mounted proximate the workpiece-engaging side of the frame. A first X-axis drive arrangement drives the working module along the X-axis rails of the first positioning device. The second positioning device comprises at least one X-axis rail mounted on the side of the frame opposite the workpiece-engaging side. A remote end of the working module is driven along the rail of the second positioning device by a second X-axis drive arrangement that is controllable independently of the first X-axis drive arrangement. The working module is slidable along a first pair of Y-axis rails that extend between and are slidably connected to the first pair of X-axis rails, and is driven in the Y direction by a first Y-axis drive arrangement. The remote end of the working module is slidable along at least one second Y-axis rail that is slidably connected to the second X-axis rail, and is driven in the Y direction by a second Y-axis drive arrangement that is controllable independently of the first Y-axis drive arrangement.

In a preferred embodiment of the invention, the machine includes a plurality of vacuum devices mounted on the workpiece-engaging side of the frame for engaging the workpiece and urging the machine against the workpiece by vacuum so as to stabilize the machine.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

Figure 1:
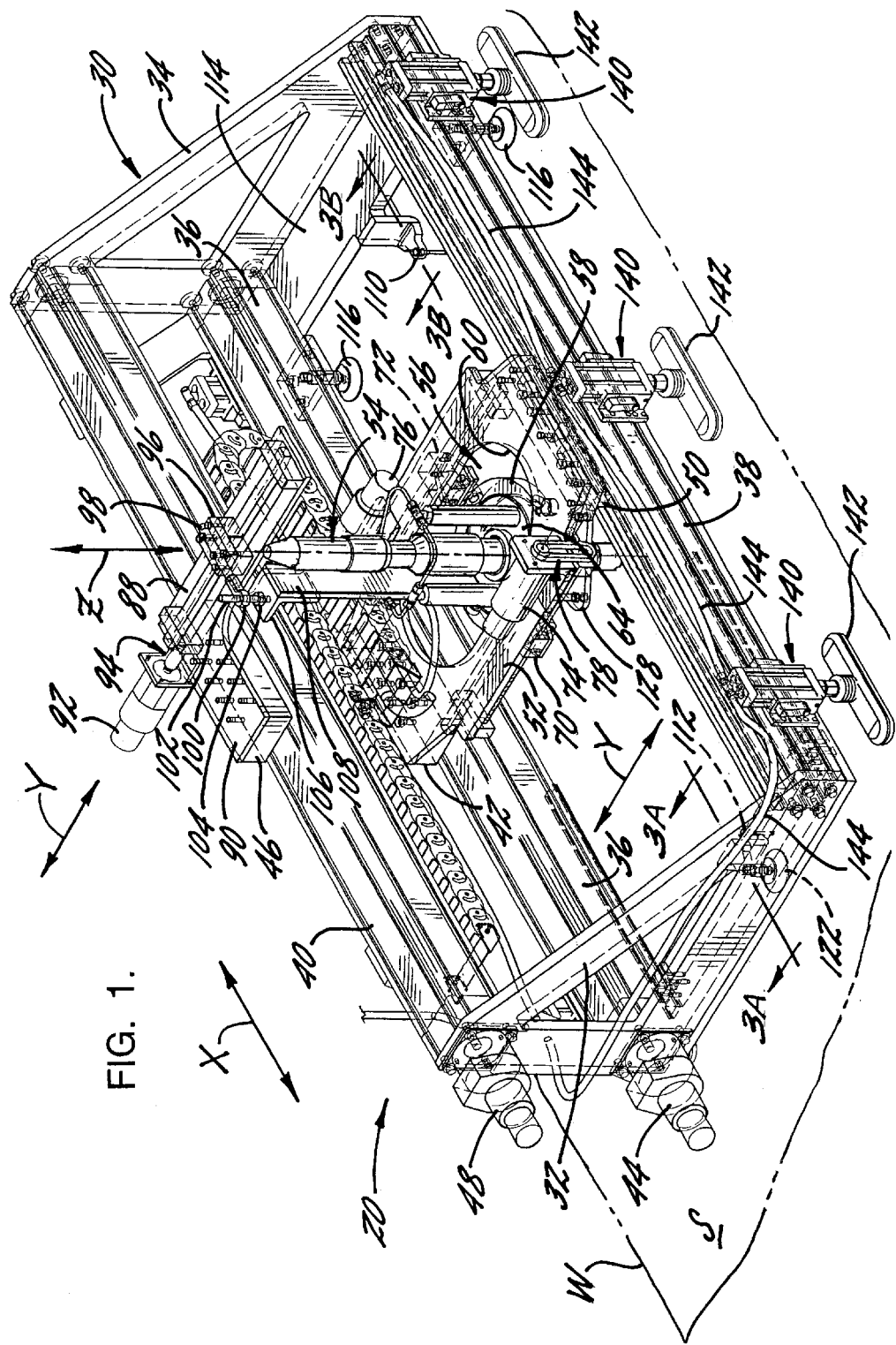
FIG. 1 is a perspective view of a portable multi-axis drilling machine in accordance with one embodiment of the invention.
Figure 2:
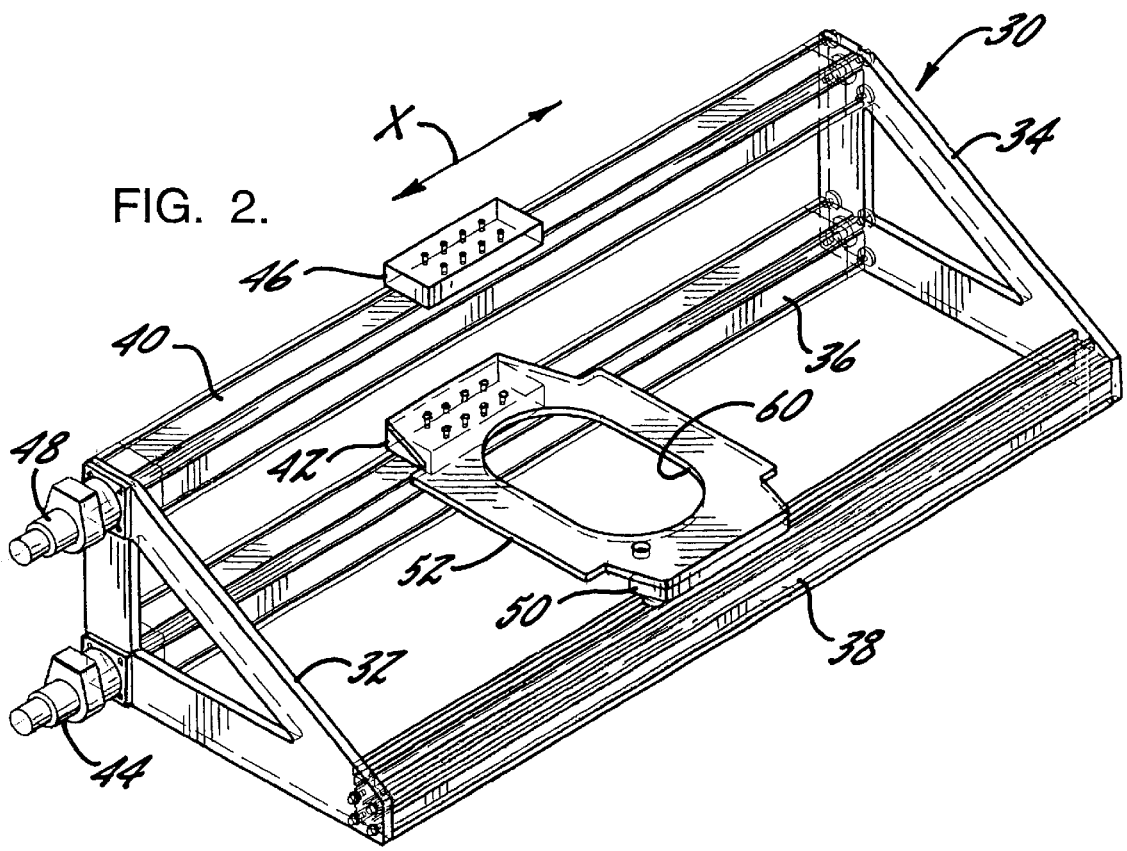
FIG. 2 is a perspective view of a frame of the drilling machine, viewed generally from above.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to the drawings, a portable multi-axis drilling machine 20 in accordance with one preferred embodiment of the invention is depicted. The machine 20 includes a frame 30 formed by a first end plate 32, a second end plate 34 parallel to the first end plate and spaced therefrom along an X axis of the machine, a first X-axis drive rail 36 connected between the end plates parallel to the X axis, a first X-axis idler rail 38 connected between the end plates parallel to the drive rail 36 and spaced therefrom along a Y axis of the machine, and a second X-axis drive rail 40 connected between the end plates parallel to the first X-axis drive rail 36 and spaced therefrom along a Z axis of the machine. The drive and idler rails 36, 38 are located adjacent a workpiece-engaging side of the frame 30, and the second drive rail 40 is located adjacent an opposite or remote side of the frame.

Each of the X-axis drive rails 36, 40 comprises a linear drive device. The first X-axis drive rail 36 includes a slide block 42 that is slidable along the rail and is connected to an internal drive arrangement (not shown) disposed within the rail and coupled to a first X-axis drive motor 44 for actuating the internal drive arrangement so as to drive the slide block 42 along the rail. Similarly, the second X-axis drive rail 40 includes a slide block 46 connected to an internal drive arrangement (not shown) within the rail and coupled to a second X-axis drive motor 48 for driving the slide block 46 along the rail. The X-axis drive rails advantageously can comprise ERS 80 linear drives available from the Daedal division of Parker Hannifan of Harrison City, Pennsylvania. The two X-axis drive motors 44, 48 are controllable independently of each other. The X-axis idler rail 38 comprises a linear bearing (not shown) disposed internally within the rail and connected to a slide block 50. The rail 38 advantageously can comprise an ELS8080 with ESR45W rail also available from the Daedal division of Parker Hannifan. However, it will be understood that the drive rails can alternatively comprise various other types of linear drive devices, including screw drive devices, pneumatic or hydraulic cylinders, linear magnetic drive devices, or the like. Similarly, the idler rail can comprise other types of linear bearing devices.

The slide block 42 on the first X-axis drive rail 36 and the slide block 50 on the X-axis idler rail 38 are aligned with each other in the X-axis direction. A gimbal assembly support plate 52 is affixed at its opposite ends to the slide blocks 42, 50. Accordingly, operation of the first X-axis drive motor 44 causes the support plate 52 to be driven along the rails 36, 38 in the X direction.

Figure 6:
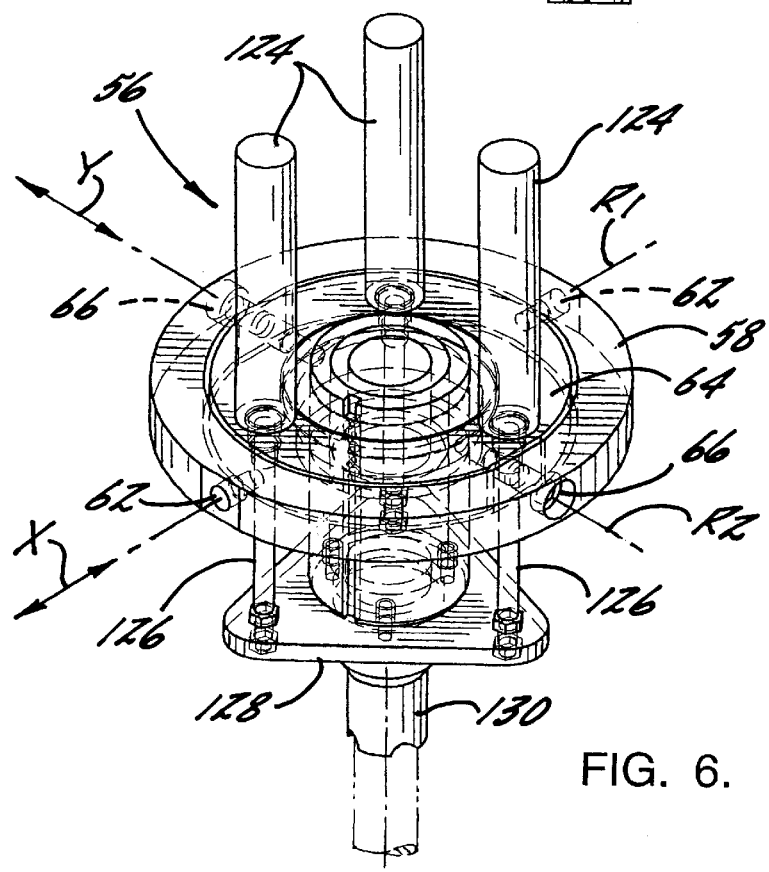
FIG. 6 is a perspective view of the gimbal assembly in isolation.

A working module in the form of a drill 54 is mounted in a gimbal assembly 56 that is in turn mounted on the gimbal assembly support plate 52. With reference to FIG. 6 in particular, the gimbal assembly 56 comprises an outer gimbal ring 58 that is disposed below an aperture 60 in the support plate 52 and is rotatably supported by a pair of pivots 62 on diametrically opposite sides of the outer gimbal ring 58. The pivots 62 define a first rotational axis R1 that is generally parallel to the X axis. An inner gimbal ring 64 is disposed within the central aperture of the outer gimbal ring 58 and is rotatably attached thereto by a pair of pivots 66 on diametrically opposite sides of the inner gimbal ring 64. The pivots 66 define a second rotational axis R2 that is perpendicular to the first rotational axis R1 and is generally parallel to the Y axis. The drill 54 is slidably fit within the central aperture of the inner gimbal ring 64 so as to be slidable along an axis coinciding with the axis of the inner gimbal ring. Thus, the gimbal assembly 56 enables the orientation of the axis of the drill 54 to be varied about either or both of the rotation axes R1 and R2.

Such variation in the orientation of the drill is effected by differential translational movements of two XY positioning devices incorporated in the machine. A first XY positioning device is comprised of the first X-axis drive rail 36 and idler rail 38 with the associated first X-axis drive motor 44, and a pair of Y-axis rails 70 and 72 that are mounted on the gimbal assembly support plate 52 so as to be perpendicular to the X-axis drive rail 36 and idler rail 38. The Y-axis rails 70, 72 are spaced apart along the X axis on opposite sides of the central aperture 60 of the support plate 52. The first XY positioning device includes a pair of Y-axis drive motors 74, 76 that are respectively coupled to screw drive assemblies 78, 80 respectively associated with the Y-axis rails 70, 72. The screw drive assemblies 78, 80 are in driving engagement with a pair of slides 82, 84 that are respectively mounted on the Y-axis rails 70, 72 for translation therealong. The slides 82, 84 support the pivots 62 for the outer gimbal ring 58. Thus, operation of the Y-axis drive motors 74, 76 causes the entire gimbal assembly 56 to be translated in the Y direction within the aperture 60 of the gimbal support plate 52. Accordingly, the first XY positioning device can position the drill 54 anywhere within the XY working envelope of the machine by suitable operation of the X-axis and Y-axis drive motors. All of these drive motors advantageously comprise stepper motors with encoders so that they can be controlled with a suitable numerical control system.

The machine also includes a second XY positioning device that is comprised of the second X-axis drive rail 40 and associated X-axis drive motor 48, and a Y-axis rail 88 that is mounted on a support plate 90 affixed to the slide block 46 of the X-axis drive rail 40. A Y-axis drive motor 92 is coupled with a screw drive assembly 94 that is in driving engagement with a slide 96 that is translatable along the Y-axis rail 88. Thus, operation of the Y-axis drive motor 92 drives the slide 96 along the Y-axis rail 88. The slide 96 has a control arm 98 attached thereto and extending generally parallel to the X axis. A control arm end 100 is rotatably connected to the control arm 98 so as to be rotatable about the axis of the control arm 98. A distal end of the control arm end 100 defines an aperture therethrough extending perpendicular to the axis of the control arm and in which a pin 102 is slidably received. The pin 102 has a spherical bearing 104 mounted thereon at an end of the pin remote from the control arm end 100. The spherical bearing 104 is received within a cylindrical aperture formed in an angle section member 106 that is rigidly affixed to a plate 108 that extends generally parallel to the Z axis of the machine. An end of the plate 108 remote from the angle section member 106 is affixed to a plate (not visible in the drawings) that is in turn affixed to the inner gimbal ring 64.

Differential translational movements imparted to the control arm 98 by the second XY positioning device are transmitted via the control arm end 100, pin 102, spherical bearing 104, angle section member 106, and plate 108 to the inner gimbal ring 64, and hence to the drill 54. Therefore, the drill 54 will be rotated about either or both of the rotational axes R1 and R2 in accordance with the differential translational movements between the first and second XY positioning devices. The slidable connection between the pin 102 and the control arm end 100 represents an extendible link for accommodating the rotational movements of the drill. Because the working envelope of the machine is small and the workpiece has relatively little curvature, the range of rotational movement needed about each of the rotational axes R1 and R2 can be relatively small. For example, a range of about 30 degrees about each axis would generally be sufficient for fuselage and wing sections, and indeed even a substantially smaller range such as about 10 degrees would be sufficient for the vast majority of such sections.

Figure 3A:
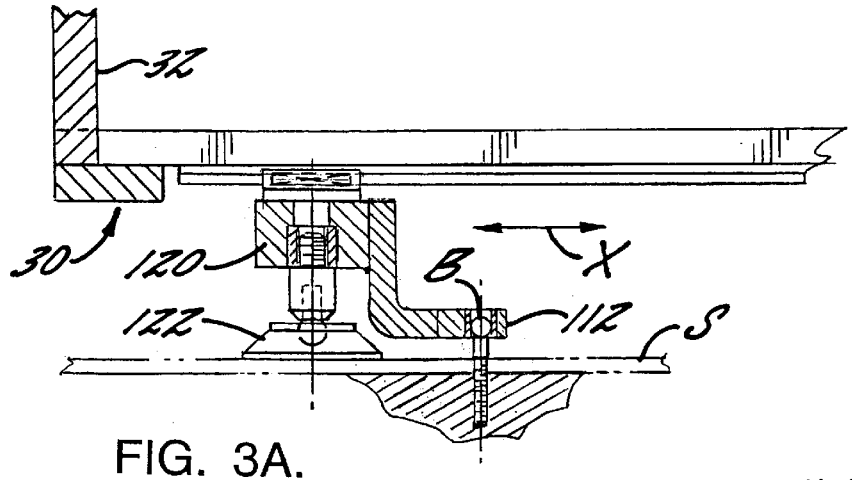
FIG. 3A is a cross-sectional view through the sliding index cylinder of the machine showing a tool ball mounted on the workpiece and received in the sliding index cylinder.
Figure 3B:
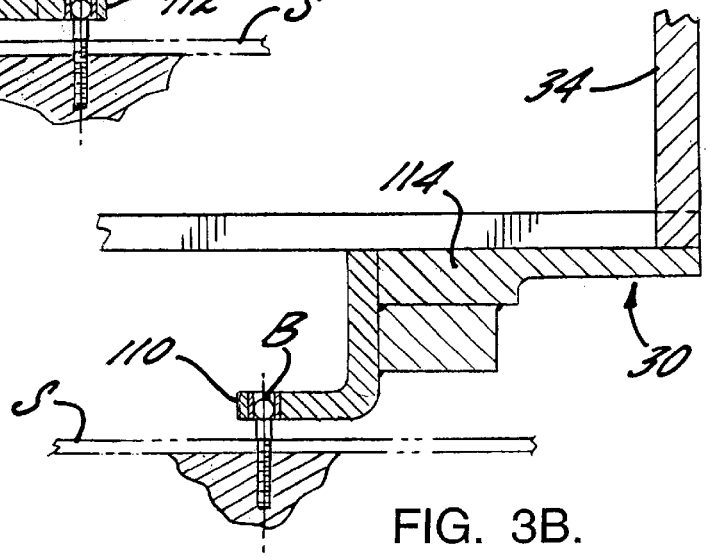
FIG. 3B is a cross-sectional view through the fixed index cylinder of the machine showing a tool ball mounted on the workpiece and received in the fixed index cylinder.
Figure 4:
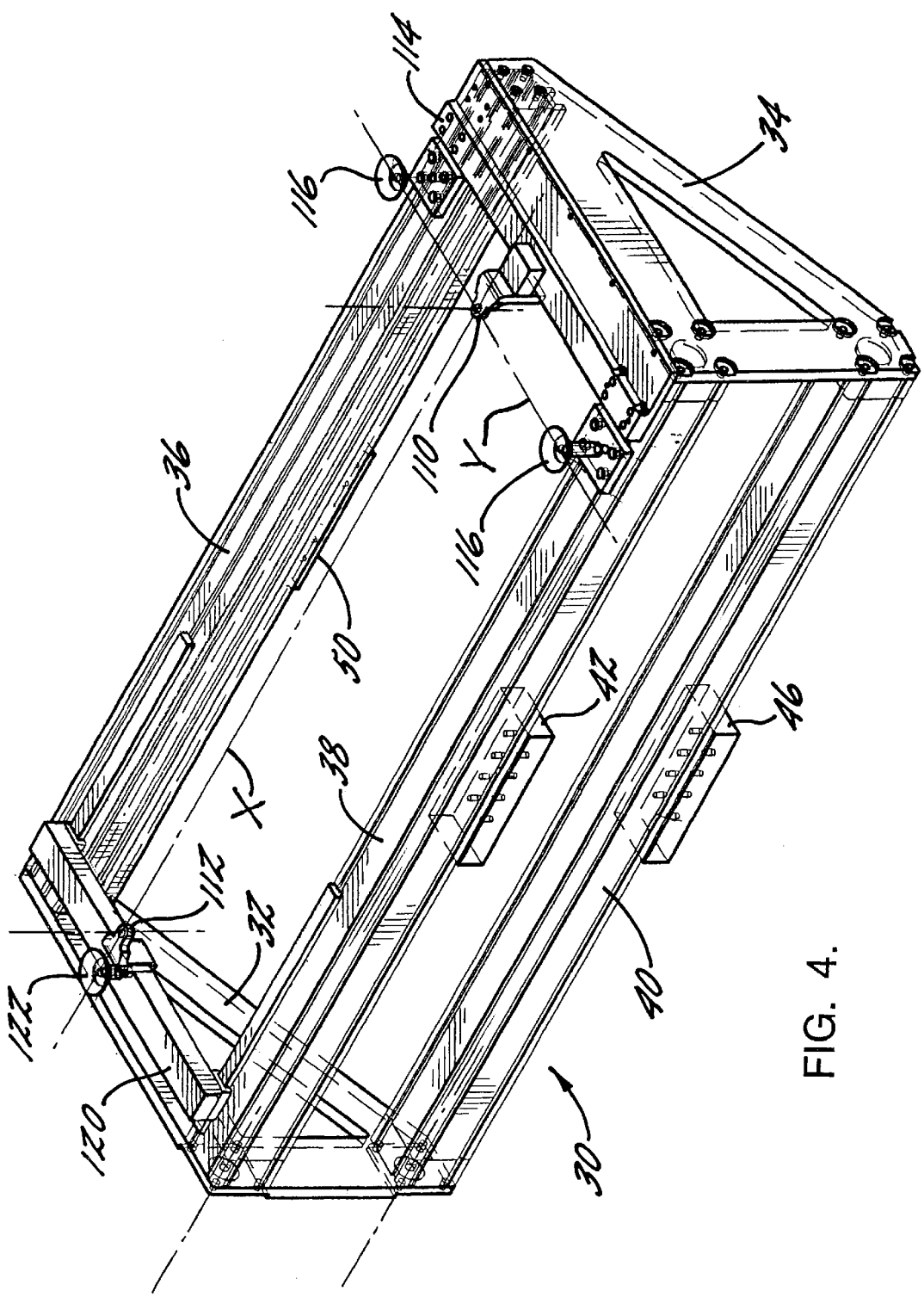
FIG. 4 is a perspective view of the frame of the machine, viewed generally from below.

As previously noted, the machine 20 eliminates the requirement of probing the workpiece being operated upon for establishing the position and orientation of the machine relative to the workpiece. With reference to FIGS. 3A, 3B, and 4, this is accomplished in the illustrated preferred embodiment by a fixed index cylinder 110 and a sliding index cylinder 112 mounted on the workpiece-engaging side of the frame of the machine. A support bar 114 for the fixed index cylinder 110 is connected between the first X-axis drive rail 36 and the idler rail 38 proximate the second end plate 34. Also mounted on the support bar 114 are a pair of swiveling support feet 116 spaced on opposite sides of the fixed index cylinder 110. The fixed index cylinder 110 defines a cylindrical aperture therein whose axis is parallel to the Z axis of the machine and is co-planar with each of the axes about which the swiveling support feet 116 are pivotable. The sliding index cylinder 112 is mounted on a sliding support bar 120 that is slidably connected to the first X-axis drive rail 36 and the idler rail 38 such that the sliding index cylinder 112 can be slid in the X-axis direction for adjusting the spacing between the fixed and sliding index cylinders. A third swiveling support foot 122 is mounted on the support bar 120. The sliding index cylinder 112 defines a cylindrical aperture therethrough whose axis is parallel to the Z axis of the machine and is co-planar with the axis of the cylindrical aperture in the fixed index cylinder 110. Furthermore, the pivot axis of the third swiveling foot 122 is co-planar with the axes of the apertures in the fixed and sliding index cylinders. This common plane that contains the axes of the index cylinders 110, 112 and the support foot 122 is parallel to the X axis of the machine in the illustrated embodiment.

In accordance with the invention, the workpiece W to be drilled is prepared for drilling by mounting a pair of spherical tool balls B (FIGS. 3A and 3B) in known locations and orientations relative to the workpiece such that the balls B project beyond the surface S of the workpiece. The spacing between the two tool balls B is within the range of spacing that can be achieved between the fixed and sliding index cylinders of the machine 20. The machine 20 is placed against the surface S of the workpiece W such that the tool balls B are received within the cylindrical apertures in the fixed and sliding index cylinders 110, 112, and such that the three swiveling support feet 116, 122 engage the workpiece surface. The weight of the machine can be supported by a suitable support mechanism (not shown) such as a counterbalance device or the like. The support feet will pivot as necessary depending on the contour of the surface. The tool balls B fit closely within the cylindrical apertures of the fixed and sliding index cylinders. Accordingly, the position and orientation of the machine 20 relative to the workpiece W are completely determined by the engagement of the tool balls B in the index cylinders 110, 112 and by the engagement of the support feet 116, 122 with the workpiece surface. The machine's numerical controller, when programmed with the numerical definition of the contour of the surface S of the workpiece and the locations of the tool balls, has all the information it needs to be able to control the various drive motors of the machine so as to align the axis of the drill 54 with the axis of a hole to be drilled anywhere within the XY working envelope of the machine. Although the illustrated preferred embodiment employs index cylinders and spherical tool balls, it will be understood that other configurations of index devices can be provided on the machine for engaging appropriately configured index fittings attached to the workpiece.

Figure 5:
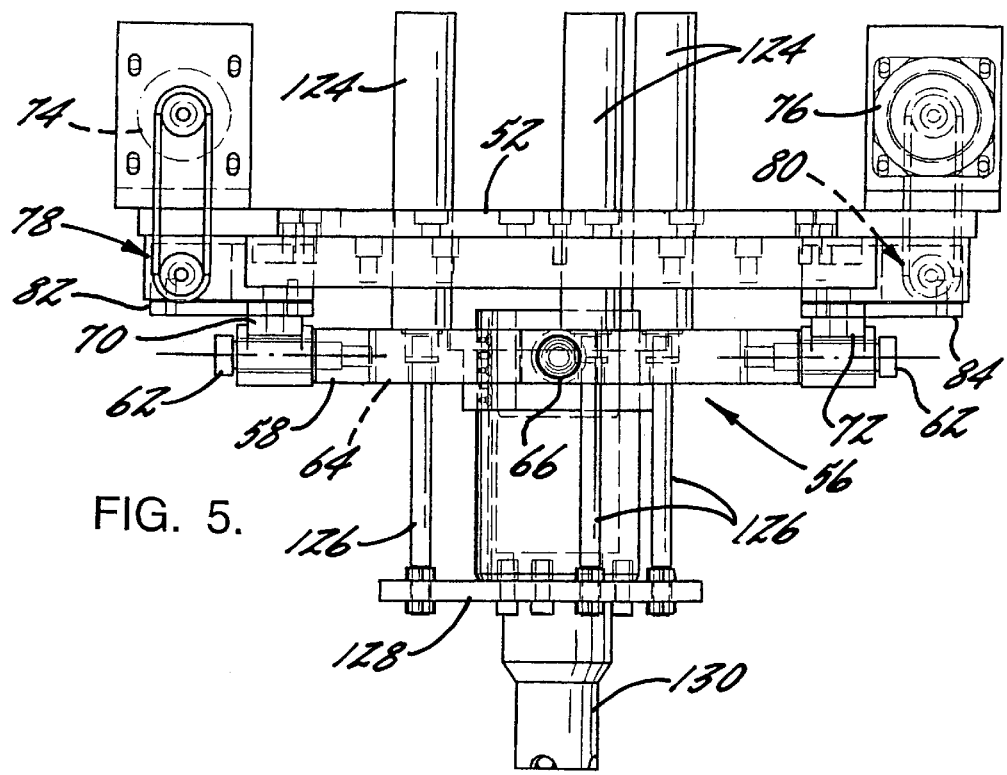
FIG. 5 is a side elevation of the gimbal assembly mounted in the machine.

With reference to FIGS. 5 and 6, the drill 54 is advanced and retracted along its axis by a plurality of fluid-operated cylinders 124 that are affixed to the inner gimbal ring 64 and have their rods 126 affixed to a thrust plate 128 that in turn is affixed to a nose piece 130 of the drill 54. Extension of the cylinder rods advances the drill toward the workpiece surface, and retraction of the rods withdraws the drill away from the workpiece surface. The cylinders 124 urge the nose piece 130 against the workpiece surface prior to drilling a hole so as to apply a pre-load force between the machine and the workpiece. This pre-load force helps stabilize the machine. The drill 54 is then operated to advance a rotating drilling tool (not shown) mounted in a spindle of the drill to drill a hole and then to retract the drilling tool. Once the hole is completed, the cylinders 124 are operated to retract the drill 54 away from the workpiece such that the nose piece 130 is spaced from the workpiece surface; the machine can then be operated to move the drill to a new location along the workpiece surface for drilling another hole. The cylinders 124 can be single-acting cylinders that are extended by fluid pressure and are retracted by internal coil springs when the fluid pressure is discontinued. Instead of fluid cylinders 124, other types of devices could be used for advancing and retracting the drill, such as ball screw mechanisms or the like. Single-acting cylinders are preferred primarily because of their simplicity, reliability, relatively low cost, and speed of operation compared to other types of devices that could be used.

The machine 20 in the illustrated preferred embodiment of the invention includes a plurality of vacuum devices 140 (FIG. 1) mounted on the frame adjacent the workpiece-engaging side thereof. The vacuum devices 140 include vacuum feet 142 that are engageable with the surface of the workpiece and are connected via vacuum lines 144 to a suitable vacuum source (not shown). When the vacuum feet are engaged with the workpiece surface and the vacuum source is operated, the vacuum produced by the vacuum feet against the workpiece surface creates a force urging the machine 20 against the workpiece. This force stabilizes the machine.

Many modifications and other embodiments of the invention will come to mind to one skilled in the art to which this invention pertains having the benefit of the teachings presented in the foregoing descriptions and the associated drawings. For example, while the invention has been explained by reference to a drilling machine, it will be appreciated that the machine could be used for positioning tools other than drills. Furthermore, although the preferred embodiment described herein has the capability of rotation about two different axes, the principal of the invention could be applied to machines having only one rotation axis (e.g., by linking together the two positioners for synchronous movement along the X axis while allowing independent movement of the positioners in the Y direction, or vice versa). Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A portable multi-axis machine for positioning a tool relative to a workpiece, the machine comprising:
   a frame structured and arranged to engage a surface of the workpiece and to engage reference features on the workpiece so as to position and orient the frame relative to the workpiece;
   a working module operable to hold a tool in a tool holder and manipulate the tool for performing a work operation on the workpiece;
   a first 2-axis positioning device mounted on the frame and a second 2-axis positioning device mounted on the frame spaced from the first 2-axis positioning device, each 2-axis positioning device being operable to translate along each of two translational axes, the working module being connected between the 2-axis positioning devices such that the working module is translated by synchronous translational movements of the 2-axis positioning devices and the working module is rotated about at least one axis by differential translational movements of the 2-axis positioning devices.

2. The machine of claim 1, wherein the first 2-axis positioning device is operable to translate along perpendicular first axes $X_1 Y_1$ and the second 2-axis positioning device is operable to translate along perpendicular second axes $X_2 Y_2$ that are parallel to the first axes and are spaced therefrom along a Z axis perpendicular to the X and Y axes.

3. The machine of claim 2, wherein orientation of the Z axis relative to the workpiece is dictated by engagement of the frame with the surface of the workpiece.

4. The machine of claim 3, wherein the frame includes a fixed index device mounted in a fixed position relative to the frame and a movable index device mounted so as to be translatable relative to the frame for varying a spacing between the fixed and movable index devices, both index devices being mounted adjacent a workpiece-engaging side of the frame for receiving a pair of index fittings rigidly affixed to the workpiece in predetermined spaced locations thereof, the index devices thereby indexing the machine relative to the workpiece.

5. The machine of claim 4, wherein the workpiece-engaging side of the frame includes three pivotal feet forming a tripod for engaging the workpiece.

6. The machine of claim 5, wherein the workpiece-engaging side of the frame includes a plurality of vacuum devices operable to urge the machine against the workpiece by vacuum.

7. The machine of claim 2, wherein each 2-axis positioning device is operable to translate along each of the respective translational axes independently of the other 2-axis positioning device, such that the working module is rotatable independently about each of two rotational axes.

8. The machine of claim 2, wherein the first 2-axis positioning device includes at least a first X-axis rail along which the working module is translatable, and the second 2-axis positioning device includes at least a second X-axis rail along which the working module is translatable.

9. The machine of claim 8, wherein each 2-axis positioning device includes at least one Y-axis rail that is translatable along the respective X-axis rail.

10. The machine of claim 9, wherein the 2-axis positioning devices are coupled to the working module via spherical bearing assemblies.

11. The machine of claim 10, wherein one of the spherical bearing assemblies comprises a gimbal assembly.

12. The machine of claim 10, wherein one of the spherical bearing assemblies includes an extendible link that is extendible in a direction generally parallel to the Z axis for accommodating rotational movement of the working module.

13. The machine of claim 2, wherein the working module is operable to advance and retract the tool holder along an axis that is generally normal to the surface of the workpiece.

14. The machine of claim 13, wherein the working module comprises a drill.

15. A portable multi-axis machine for positioning a tool relative to a workpiece, the machine comprising:

a frame having a workpiece-engaging side structured and arranged to engage a surface of the workpiece with a three-point contact therebetween such that the frame stably engages surfaces of varying and complex contour and the three-point contact establishes approximate normality between a Z-axis of the machine and the surface of the workpiece;

a working module operable to hold a tool in a tool holder and manipulate the tool for performing a work operation on the workpiece;

a first XY positioning device mounted on the frame and a second XY positioning device mounted on the frame spaced from the first XY positioning device, each of the XY positioning devices being operable to translate independently along each of two translational X and Y axes defining an XY plane parallel to that of the other XY positioning device and spaced therefrom along the Z axis, the working module being connected between the two XY positioning devices.

16. The machine of claim 15, wherein the three-point contact is provided by three swiveling feet attached to the workpiece-engaging side of the frame.

17. The machine of claim 16, further comprising a pair of index devices mounted on the frame for engaging a pair of index fittings rigidly affixed to the workpiece in predetermined locations thereof so as to fix a position and orientation of the machine relative to the workpiece.

18. The machine of claim 17, wherein one of the index devices is attached to the frame in a fixed location thereof, and the other index device is mounted on the frame so as to be slidable for adjusting a spacing between the index devices.

19. The machine of claim 18, wherein the index devices comprise index cylinders having cylindrical apertures therein for receiving a pair of generally spherical index fittings affixed to the workpiece.

20. The machine of claim 15, wherein the working module is operable to advance and retract the tool holder along a tool axis that is generally parallel to the Z axis.

21. The machine of claim 20, wherein the working module is mounted in a gimbal assembly structured and arranged such that the working module is pivotable about first and second rotational axes that are perpendicular to the tool axis.

22. The machine of claim 21, wherein the gimbal assembly is mounted in the first XY positioning device, and the second XY positioning device is coupled to the working module by a rotatable coupling accommodating the rotational movements of the working module.

23. The machine of claim 21, wherein pivotal movement of the working module is limited to a range of about 30 degrees about each of the first and second rotational axes.

24. The machine of claim 15, further comprising a plurality of vacuum devices mounted on the workpiece-engaging side of the frame and operable to urge the machine against the workpiece by vacuum.

* * * * *

UNITED STATES PATENT AND TRADEMARK OFFICE
CERTIFICATE OF CORRECTION

PATENT NO. : 6,382,889 B1
DATED : May 7, 2002
INVENTOR(S) : Brown et al.

It is certified that error appears in the above-identified patent and that said Letters Patent is hereby corrected as shown below:

Column 1,
Line 2, after the title insert the following:

-- FEDERALLY SPONSORED RESEARCH OR DEVELOPMENT
The invention was made with Government support under Contract No. F33615-98-3-5103 awarded by the Department of the Air Force. The Government has certain rights in this invention. --.

Signed and Sealed this

Twenty-eighth Day of September, 2004

JON W. DUDAS
*Director of the United States Patent and Trademark Office*